United States Patent
Mihlbauer et al.

(10) Patent No.: US 8,679,330 B2
(45) Date of Patent: Mar. 25, 2014

(54) INTEGRATED AQUARIUM FILTER ASSEMBLY INCLUDING FILTER MEDIA COMPONENTS AND AN UPSTREAM WATER PUMP

(75) Inventors: Brad L. Mihlbauer, Mukwonago, WI (US); Andrew S. Hudson, South Milwaukee, WI (US); Thomas Robert Lutz, Franklin, WI (US)

(73) Assignee: Central Garden and Pet Company, Walnut Creek, CA (US)

( * ) Notice: Subject to any disclaimer, the term of this patent is extended or adjusted under 35 U.S.C. 154(b) by 526 days.

(21) Appl. No.: 12/971,807

(22) Filed: Dec. 17, 2010

(65) Prior Publication Data

US 2011/0147288 A1  Jun. 23, 2011

Related U.S. Application Data

(60) Provisional application No. 61/287,626, filed on Dec. 17, 2009.

(51) Int. Cl.
*A01K 63/04* (2006.01)

(52) U.S. Cl.
USPC ............ 210/167.21; 210/167.25; 210/232; 210/282; 210/416.2; 119/259

(58) Field of Classification Search
USPC ......... 210/167.22, 167.25, 167.27, 232, 252, 210/261, 282, 335, 416.1, 416.2, 167.21; 119/259, 260
See application file for complete search history.

(56) References Cited

U.S. PATENT DOCUMENTS

| | | | |
|---|---|---|---|
| 3,891,555 A * | 6/1975 | Bennett et al. | 210/167.23 |
| 4,851,112 A * | 7/1989 | Schlensker | 210/123 |
| 4,915,828 A | 4/1990 | Meyers et al. | |
| 4,944,871 A | 7/1990 | Ogawa | |
| 5,006,230 A * | 4/1991 | Votava et al. | 210/94 |
| 5,011,600 A | 4/1991 | Mowka et al. | |
| 5,059,315 A | 10/1991 | Senape | |
| 5,078,867 A * | 1/1992 | Danner | 210/167.22 |
| 5,139,656 A | 8/1992 | Gonnello | |
| 5,160,607 A | 11/1992 | Thiemer et al. | |
| 5,171,438 A | 12/1992 | Korcz | |
| 5,172,650 A | 12/1992 | Hsu et al. | |
| 5,242,582 A | 9/1993 | Marioni | |
| 5,245,945 A | 9/1993 | Liao | |
| 5,277,800 A | 1/1994 | Dieckmann et al. | |
| 5,294,335 A * | 3/1994 | Chiang | 210/167.21 |
| 5,306,421 A | 4/1994 | Weinstein | |
| 5,397,463 A | 3/1995 | Woltmann | |
| 5,449,454 A * | 9/1995 | Hickok | 210/188 |
| 5,514,280 A | 5/1996 | Logan | |
| 5,567,315 A * | 10/1996 | Weidenmann et al. | 210/123 |
| 5,585,010 A | 12/1996 | Dockery et al. | |
| 5,667,671 A | 9/1997 | Munsch et al. | |
| 5,863,425 A * | 1/1999 | Herlehy et al. | 210/167.17 |
| 7,022,227 B1 | 4/2006 | Liao | |
| 7,033,491 B2 | 4/2006 | Chang | |

(Continued)

*Primary Examiner* — Fred Prince
(74) *Attorney, Agent, or Firm* — Andrus Intellectual Property Law, LLP (57) ABSTRACT

Disclosed are filter assemblies for an aquarium tank. The disclosed assemblies include a filter basket assembly in which one or more filter baskets are connected, either directly or indirectly, to a filter pump basket. The filter pump basket typically is located upstream of the one or more filter baskets and pumps water upwards through the filter basket assembly.

17 Claims, 10 Drawing Sheets

(56) References Cited

U.S. PATENT DOCUMENTS

| | | | |
|---|---|---|---|
| 7,208,084 B2 * | 4/2007 | Axelrod | 210/167.21 |
| 7,311,819 B2 | 12/2007 | Hochgesang et al. | |
| 7,335,298 B2 * | 2/2008 | Axelrod | 210/167.22 |
| 7,569,139 B2 | 8/2009 | Mihlbauer et al. | |
| 7,594,998 B2 | 9/2009 | Mihlbauer et al. | |
| 7,601,259 B2 | 10/2009 | Mihlbauer et al. | |
| 7,618,534 B2 | 11/2009 | Mihlbauer et al. | |
| 7,771,592 B2 | 8/2010 | Mihlbauer et al. | |
| 2006/0049086 A1 * | 3/2006 | Axelrod | 210/169 |
| 2007/0209986 A1 * | 9/2007 | Axelrod | 210/167.22 |

* cited by examiner

INTEGRATED AQUARIUM FILTER ASSEMBLY INCLUDING FILTER MEDIA COMPONENTS AND AN UPSTREAM WATER PUMP

CROSS-REFERENCE TO RELATED APPLICATIONS

The present application claims the benefit of priority under 35 U.S.C. 119(e) to U.S. Provisional Patent Application No. 61/287,626, filed on Dec. 17, 2009, the content of which is incorporated herein by reference in its entirety.

BACKGROUND

The field of the invention relates to aquarium filter assemblies. In particular, the field relates to aquarium filter assemblies having multiple interconnected components.

Aquarium filters are known in the art. For example, aquarium filters are described in U.S. Pat. Nos. 7,771,592; 7,618,534; 7,601,259; 7,594,998; 7,569,139; 7,311,819; 7,033,491; 7,022,227; 5,667,671; 5,585,010; 5,514,280; 5,397,463; 5,306,421; 5,277,800; 5,245,945; 5,242,582; 5,172,650; 5,171,438; 5,160,607; 5,139,656; 5,059,315; 5,011,600; 4,944,871, and 4,915,828, the contents of which are incorporated herein by reference in their entireties.

Aquarium filters typically are located outside of the aquarium tank. However, some aquarium filters are located within the aquarium tank for various reasons. These inner tank filters typically are attached to the inside of the aquarium tank via suction cups or hang on the edge of the aquarium tank. Less commonly, inner tank filters are glued to the rear aquarium tank wall with silicone as a permanent component of the aquarium tank. In these inner tank filters, the filter media and water pump are often in different chambers or in different sections of the filter and are not directly connected. Typically, the filter media and water pump must be removed, cleaned, and replaced separately. The only way to remove both the filter media and the water pump at the same time is to remove the entire filter housing from the aquarium, provided that the filter housing is not permanently attached to the aquarium tank wall. It is desirable to provide an inner tank filter in which the filter media and water pump are integrated and can be removed together for servicing.

Furthermore, in most aquarium filters the water pump is located downstream of the filter media. As such, the water pump is forced to pull water through the filter media creating a negative pressure gradient within the filter media compared to the surrounding water. As such, water-flow through the water pump and into the aquarium decreases as the filter media clogs. It is desirable to provide a filter in which the water pump is located upstream of the filter media so that the water pump creates a positive pressure gradient within the filter media compared to the surrounding water. It also is desirable to provide a filter in which the water pump is located upstream of the filter media and in which when the filter media clogs, water can bypass the filter media and circulate back into the water pump so that the net flow of water through the water pump and into the aquarium does not decrease.

SUMMARY

Disclosed are aquarium filter assemblies. The disclosed assemblies typically are configured for use in the interior of an aquarium tank. The disclosed assemblies typically include a plurality of filter baskets and the plurality of filter baskets typically include: (a) at least a downstream filter cartridge basket having a filter cartridge disposed therein and having at least a partially grated floor; and (b) an upstream filter pump basket and a filter pump connected thereto. The plurality of baskets is connected at one or more sealed junctures. In the disclosed assemblies, water is pumped into the downstream filter pump basket, upwards through the grated floor of the upstream filter basket, through the filter cartridge, and out of the downstream filter cartridge basket.

In some embodiments of the disclosed filter assemblies, the assemblies further include (c) at least one intermediary filter basket between the downstream filter cartridge basket and the upstream filter pump basket. The intermediary filter basket may be connected at a sealed juncture to the downstream filter cartridge basket and/or may be connected at a sealed juncture to the upstream filter pump basket. The intermediary filter basket has at least a partially grated floor. In these embodiments of the disclosed filter assemblies, water is pumped into the intermediary filter pump basket, upwards through the grated floor of the intermediary filter basket, upwards through the grated floor of the downstream filter basket, through the filter cartridge, and out of the downstream filter cartridge basket.

In other embodiments of the disclosed filter assemblies, the downstream filter cartridge basket is connected directly to the upstream filter pump basket at a sealed juncture. In these embodiments of the disclosed filter assemblies, water is pumped into the downstream filter pump basket, upwards directly through the grated floor of the upstream filter basket, through the filter cartridge, and out of the downstream filter cartridge basket.

In the disclosed filter assemblies, the filter cartridge typically divides the downstream filter cartridge basket to provide an inner plenum and an outer plenum. For example, the filter cartridge may divide the downstream filter cartridge basket laterally to provide an inner plenum and an outer plenum. In the disclosed filter assemblies, the at least partially grated floor typically is provided at the bottom of the inner plenum. The downstream filter cartridge basket further may include a solid floor provided at the bottom of the outer plenum.

In the disclosed filter assemblies, the downstream filter cartridge basket further may include a spout. For example, the downstream filter cartridge basket further may include a spout directing water back into the aquarium tank after the water has been directed upwards through the grated floor of the downstream filter basket and through the filter cartridge.

The downstream filter cartridge may include overflow channels. For example, the downstream filter cartridge may include lateral overflow channels oriented perpendicular to the spout of the downstream filter cartridge basket and positioned upstream of the filter cartridge. The overflow channels may function to redirect water back into the aquarium tank when the filter cartridge becomes clogged and does not permit adequate flow therethrough and back to the aquarium tank via the spout. The overflow channels therefore permit bypass flow with respect to the filter cartridge.

In the disclosed filter assemblies, the plurality of baskets is connected at one or more sealed junctures. In some embodiments, the one or more sealed junctures are provided by interlocking male and female components at a top perimeter of one filter basket and a bottom perimeter of an adjacent downstream filter basket. For example, the interlocking male and female components may provide a sealed juncture via a friction fit. The friction fit, for example, may be provided by interlocking ridge and groove components. Adjacent filter baskets further may be connected by one or more additional interlocking male and female components. For example, adjacent filter baskets further may be connected by one or more slot and latch mechanisms.

The disclosed filter assemblies typically include a filter pump connected directly or indirectly to the upstream filter pump basket. In some embodiments, the disclosed assemblies include a horizontally oriented filter pump connected to the upstream filter pump basket, for example, where the filter pump moves water from the tank in a horizontal direction and redirects the water vertically through the filter assembly. In other embodiments, the disclosed assemblies include a vertically oriented filter pump connected to the upstream filter pump basket, for example where the filter pump moves water from the tank in a vertical direction and directs the water vertically through the filter assembly. The filter pump may be connected to the exterior of the upstream filter pump basket or alternatively may be contained within the upstream filter pump basket.

DETAILED DESCRIPTION

Disclosed are filter assemblies for aquariums. In the presently disclosed filter assemblies, the filter media and filter pump are connected directly or connected indirectly via one or more intermediary filter baskets. This configuration allows the filter pump to be removed from the filter together with the filter media. The filter housing preferably remains in place within the aquarium after the filter pump and filter media have been removed.

Also in the presently disclosed filter assemblies, the filter pump is located upstream of the filter media so that the water pump creates a positive pressure gradient within the filter assembly compared to the surrounding water. The disclosed filter assembly typically utilizes power more efficiently than filter assemblies in which the water pump is downstream of the filter media. In the disclosed filter assemblies, when the filter media clogs, the water can bypass the filter media and circulate back into the filter pump so that the net flow of water through the filter pump and to the aquarium does not decrease.

Figure 1:
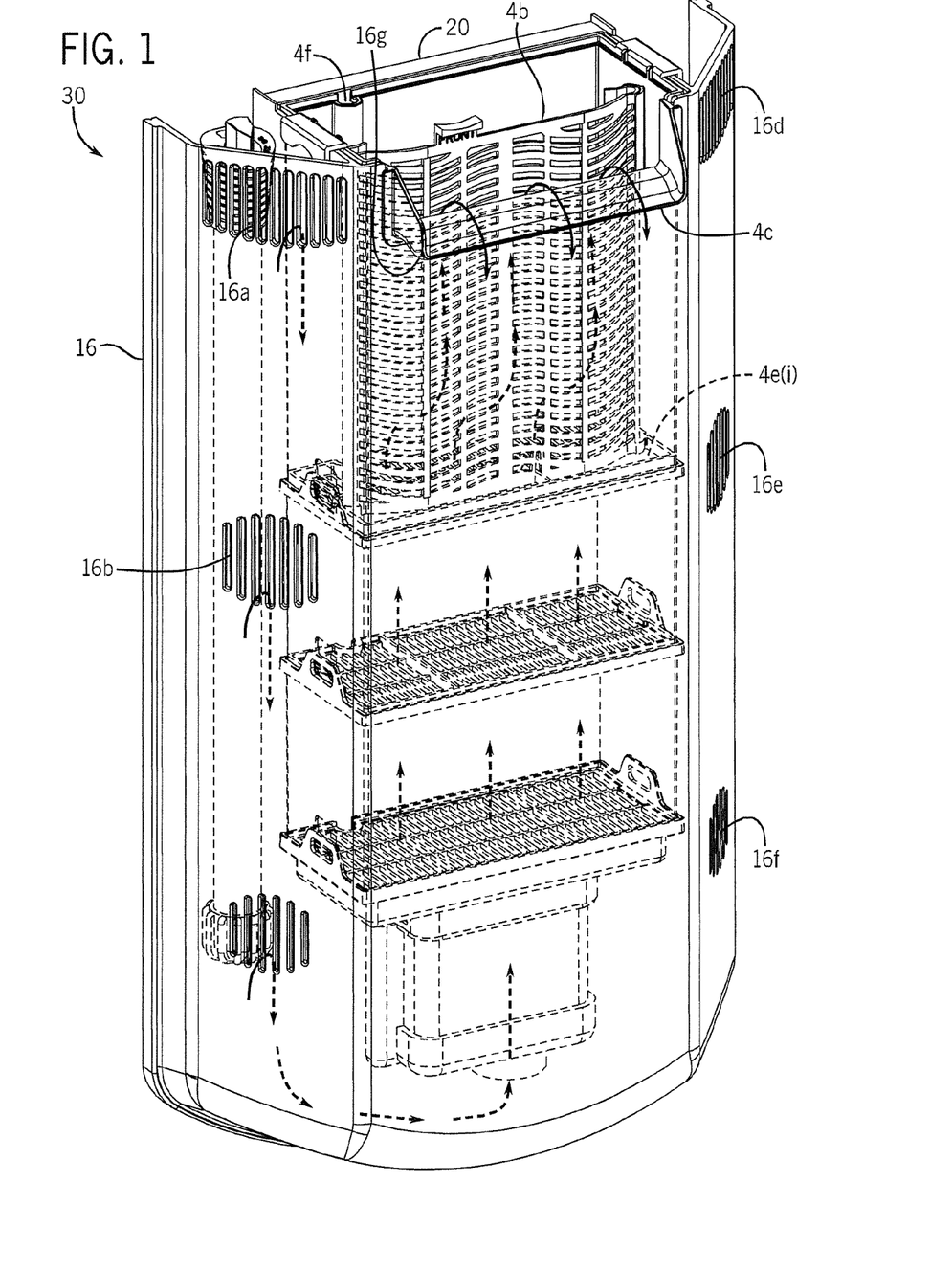
FIG. 1 provides a front perspective view of one embodiment of a filter basket assembly as contemplated herein.
Figure 2:
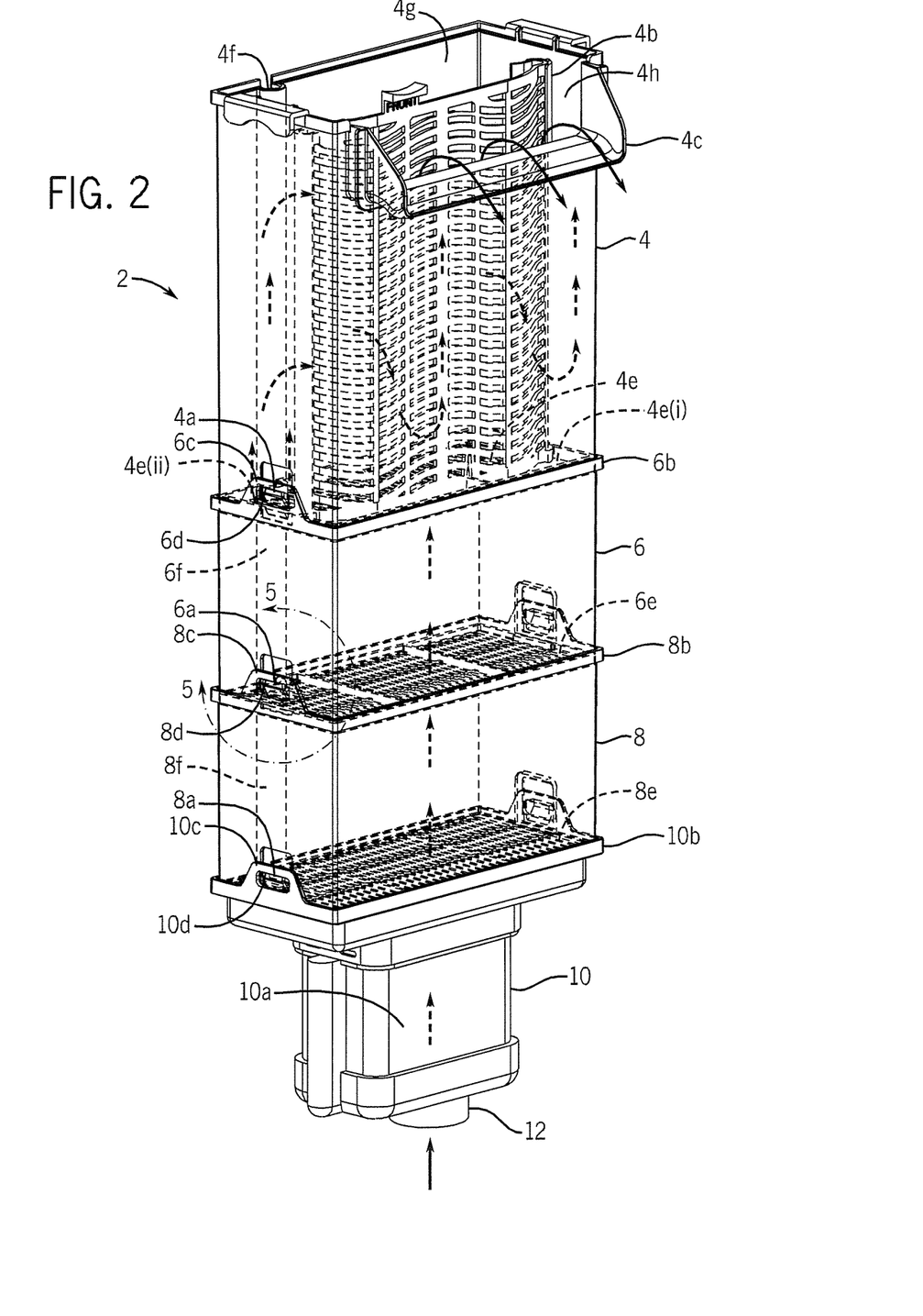
FIG. 2 provides a front perspective view of the filter basket assembly as shown in FIG. 1 having the housing removed.

Referring now to the figures, FIGS. 1 and 2 provide a front perspective view of one embodiment of a filter assembly 30 and a filter basket assembly 2 as contemplated herein. Upstream-to-downstream water-flow through the assembly 2 is indicated by dashed arrows. In FIG. 1, the filter assembly 30 includes a housing 16 that houses the filter basket assembly 2 within a holster 20. The housing 16, includes one or more inlet grates 16a, 16b, 16c, 16d, 16e, and 16f through which water of the aquarium tank may enter or exit the housing 16. For example, water may enter the housing 16 via the inlet grates 16a, 16b, 16c, 16d, 16e, and 16f, flow into the filter basket assembly 2, and return back into the aquarium tank as indicated by arrows. The spout 4c may rest on a lip 16g of the housing.

Figure 3:
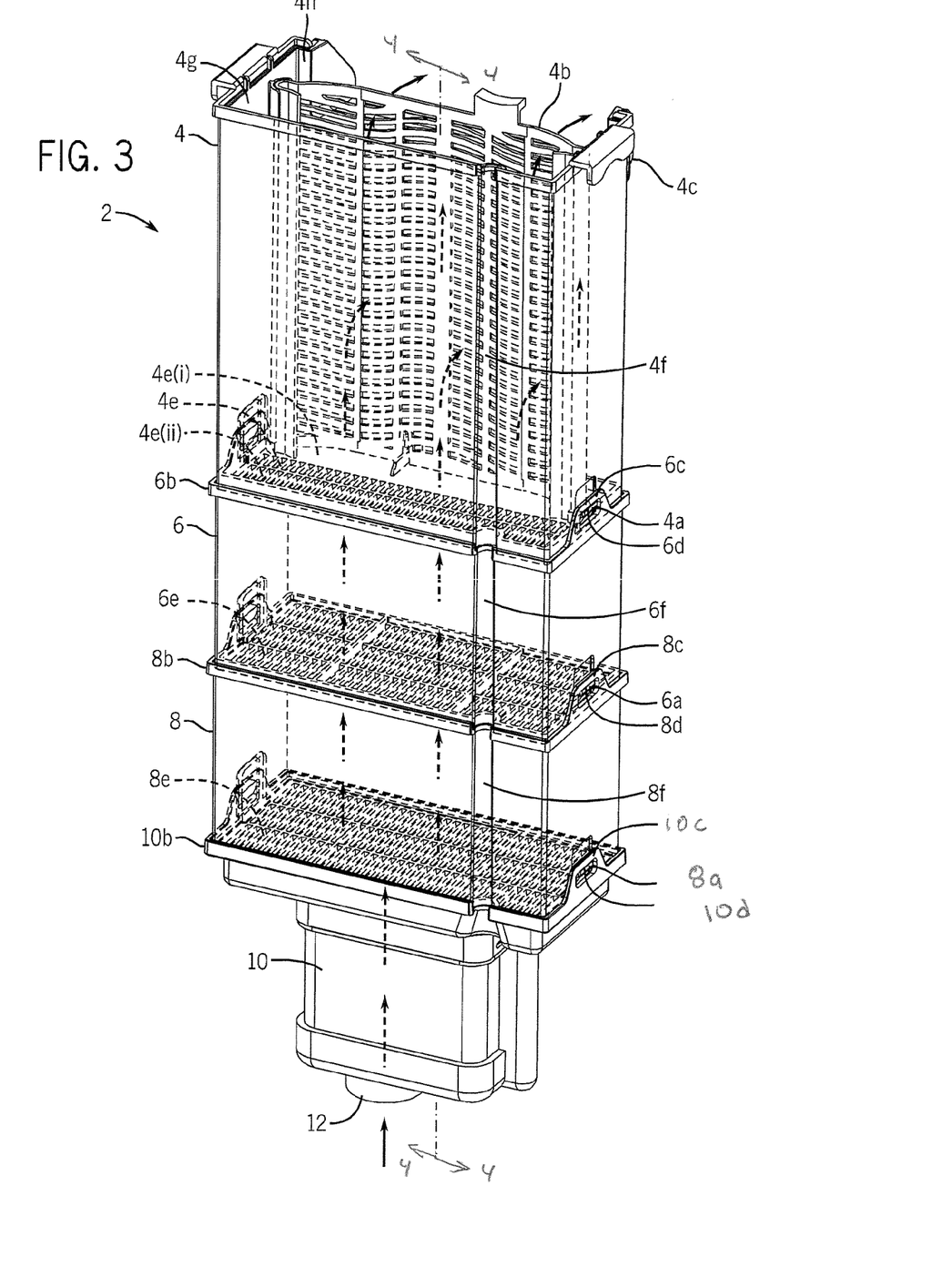
FIG. 3 provides a back perspective view of the filter basket assembly as shown in FIG. 1 having the housing removed.
Figure 4:
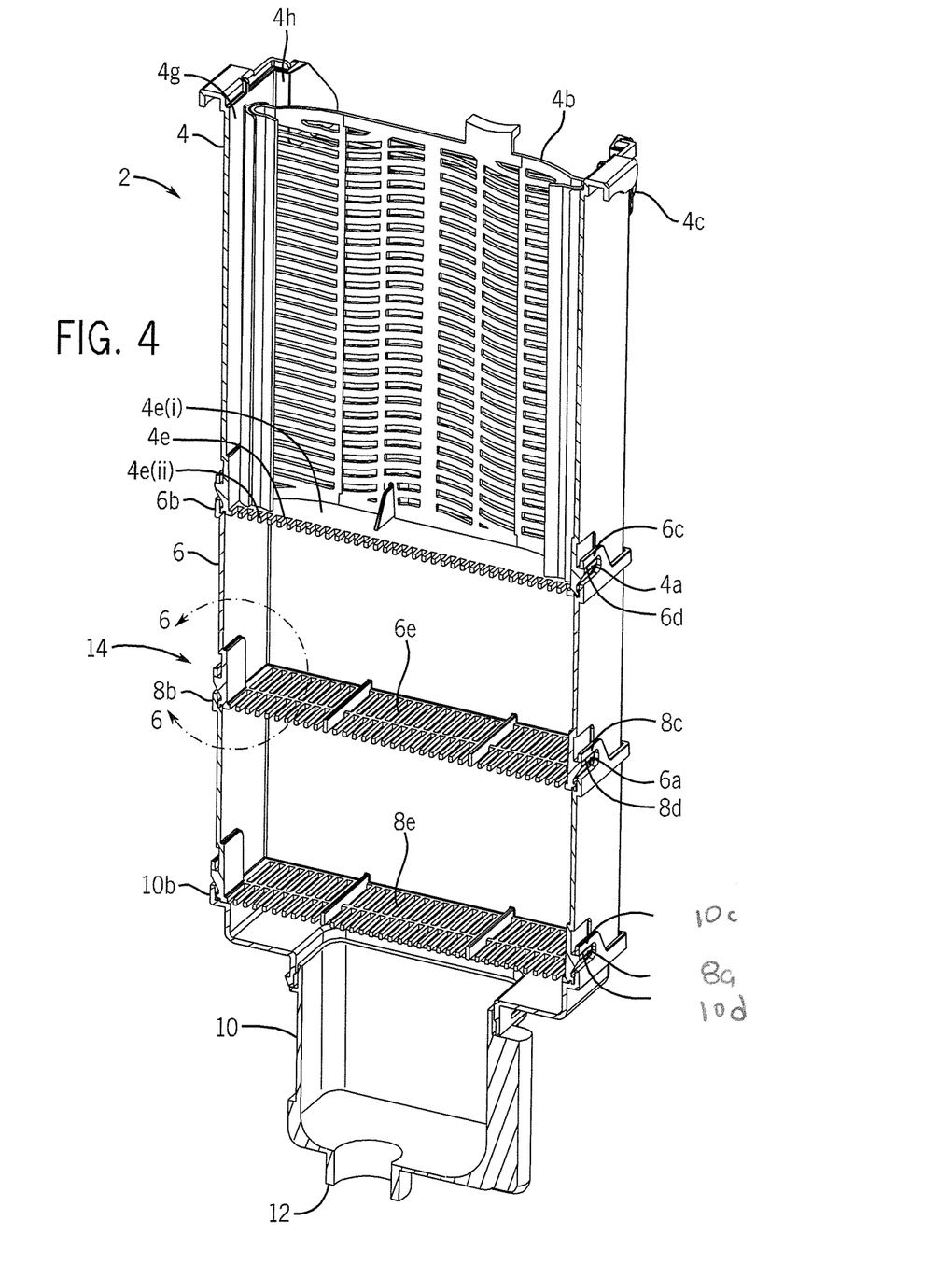
FIG. 4 provides a cut away view of the filter basked assembly as shown in FIG. 3 along the plane defined by 4-4.

As shown in FIGS. 2 and 3, the assembly 2 includes a plurality of filter baskets 4, 6, 8, 10. Upstream-to-downstream water-flow through the assembly 2 is indicated by dashed arrows. The plurality includes a downstream filter cartridge basket 4. The downstream filter cartridge basket 4 includes a filter cartridge 4b that encloses a filter element (not shown) containing filter media (not shown). The downstream filter cartridge basket 4 also includes a spout 4c for directing water into the aquarium tank. The filter cartridge 4b divides the interior space of the downstream filter cartridge basket 4 to provide an inner plenum 4g behind the filter cartridge and an outer plenum 4h in front of the filter cartridge 4b. The downstream filter cartridge basket 4 has a grated floor 4e(ii) at the bottom of the inner plenum 4g, permitting water-flow therethrough, and a solid floor 4c(i) at the bottom of the outer plenum 4h, preventing water-flow therethough (FIG. 4).

Figure 5:
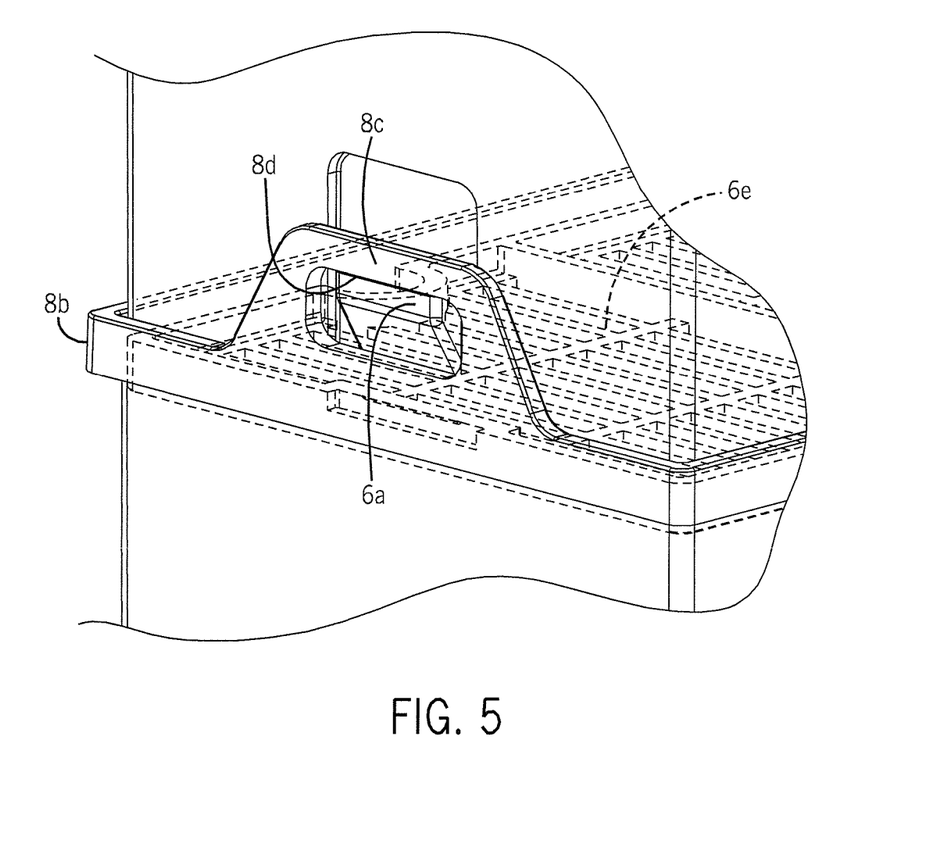
FIG. 5 provides an enlarged perspective view of the juncture of filter baskets of the assembly as shown in FIG. 2 along the plane defined by 5-5.
Figure 6:
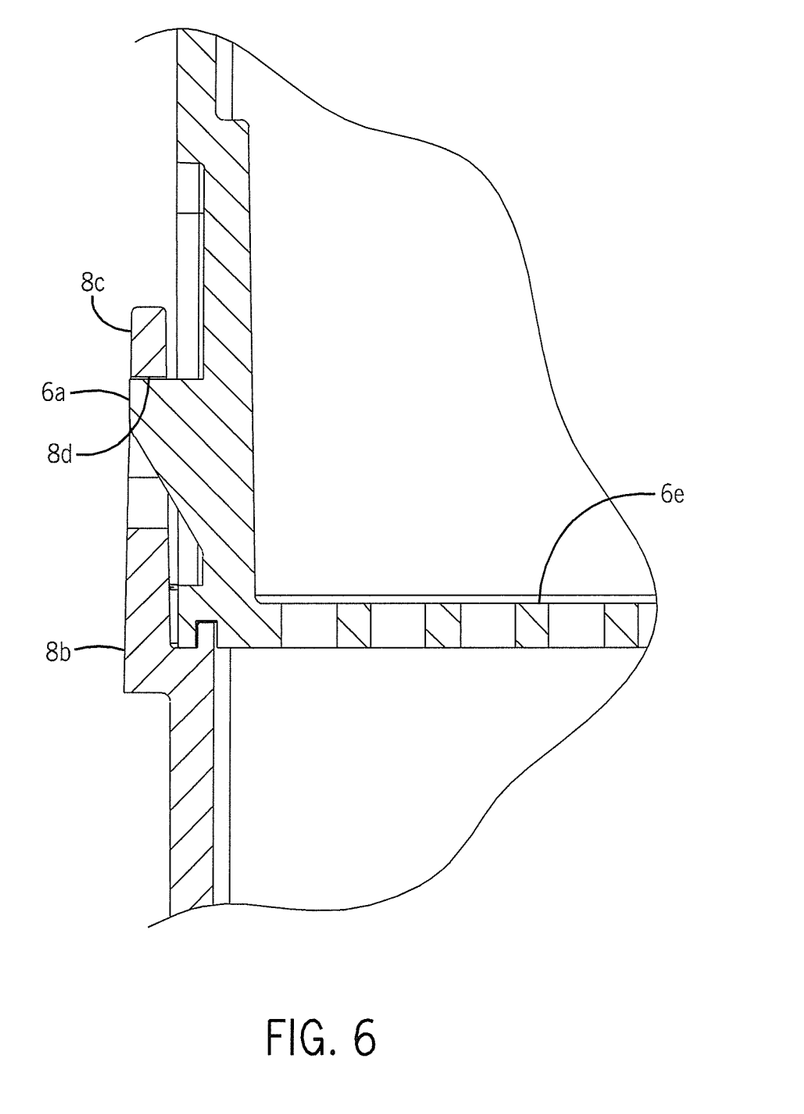
FIG. 6 provides an enlarged cross-sectional view of the juncture of filter baskets of the assembly as shown in FIG. 4 along the plane defined by 6-6.

The downstream filter cartridge basket 4 is connected to an adjacent upstream intermediary filter basket 6 via a latch slot mechanism. As shown in FIGS. 2-4, the downstream filter cartridge basket 4 includes a latch 4a that is inserted into a slot 6d of the adjacent upstream intermediary filter basket 6. The slot 6d is present in a handle 6c of the adjacent upstream intermediary filter basket 6. The upstream downstream filter cartridge basket 4 and the adjacent upstream intermediary filter basket 6 further are connected by a sealed juncture as disclosed below (see FIGS. 5 and 6), which is formed by an interlocking ridge and groove mechanism present around the bottom perimeter of the upstream downstream filter cartridge basket 4 and present around the top trim 6b of the adjacent upstream intermediary filter basket 6. The floor 6e of the adjacent upstream intermediary filter basket 6 is grated, permitting water-flow therethrough.

The adjacent upstream intermediary filter basket 6 is connected to an adjacent further upstream intermediary filter basket 8 via a latch slot mechanism. As shown in FIGS. 2-4, the adjacent upstream intermediary filter basket 6 includes a latch 6a that is inserted into a slot 8d of the adjacent further upstream intermediary filter basket 8. The slot 8d is present in a handle 8c of the adjacent further upstream intermediary filter basket 8. The adjacent upstream intermediary filter basket 6 and the adjacent further upstream intermediary filter basket 8 further are connected by a sealed juncture as disclosed in FIGS. 5 and 6, which is formed by an interlocking ridge and groove mechanism present around the bottom perimeter of the adjacent upstream intermediary filter basket 6 and present around the top trim 8b of the adjacent further upstream intermediary filter basket 6. The floor 8e of the adjacent further upstream intermediary filter basket 8 is grated, permitting water-flow therethrough.

The adjacent further upstream intermediary filter basket 8 is connected to a filter pump basket 10 via a latch slot mechanism. As shown in FIGS. 2-4, the adjacent further upstream intermediary filter basket 8 includes a latch 8a that is inserted into a slot 10d of the filter pump basket 10. The slot 10d is present in a handle 10c of the filter pump basket 10. The adjacent further upstream intermediary filter basket 8 and the filter pump basket 10 further are connected by a sealed juncture as disclosed above (see FIGS. 5 and 6), which is formed by an interlocking ridge and groove mechanism present around the bottom perimeter of the adjacent further upstream intermediary filter basket 8 and present around the top trim 10b of the filter pump basket 10. The filter pump basket includes a vertically oriented interior filter pump 10a (not shown) and further includes an inlet 12 through which water is pulled and pumped vertically upwards through the assembly as illustrated by the dashed arrows. As indicated by the dashed arrows in FIGS. 1-3, water-flows through the filter basket assembly 2, in consecutive order, first into the filter pump basket 10, upwards through the grated floor 8e of the adjacent further upstream intermediary filter basket 8, upwards through the grated floor 6e of the adjacent upstream intermediary filter basket 6, upwards through the grated floor 4e(ii) of the inner plenum 4g of the filter cartridge basket 4, through the filter cartridge (including through the enclosed filter element (not shown) and contained filter media (not shown)), into the outer plenum 4h of the filter cartridge basket, over the spout 4c, and back into the aquarium tank. The sealed junctures of the filter baskets are configured to prevent leakage as the water-flows upwards through the filter basket assembly.

Figure 7:
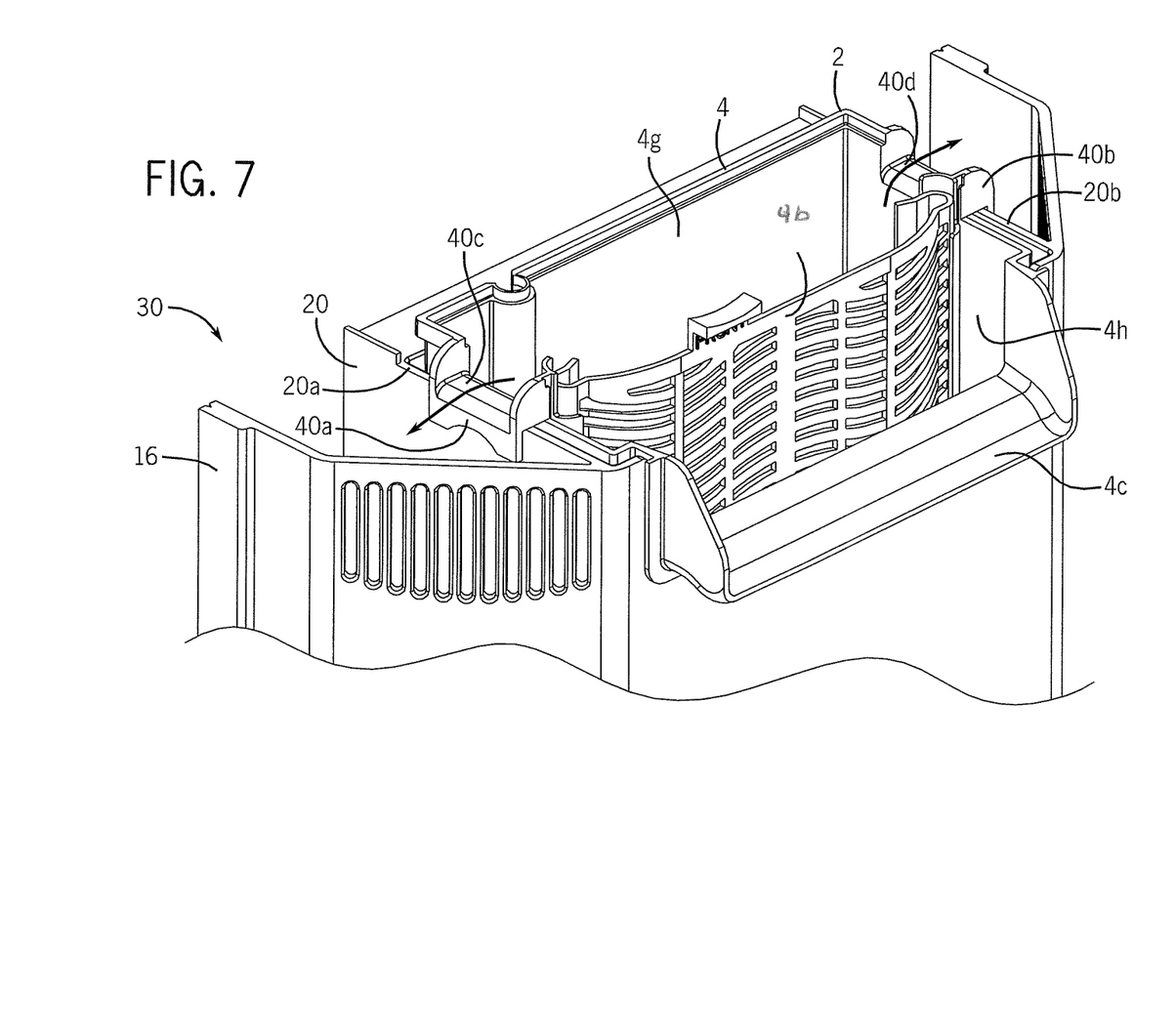
FIG. 7 provides an enlarged top front perspective view of one embodiment of a filter assembly as contemplated herein.

FIG. 7 provides an enlarged top front perspective view of one embodiment of a filter assembly 30 as contemplated herein. The filter assembly 30 includes a housing 16 that houses the filter basket assembly 2 within a holster 20. In this embodiment, the filter cartridge basket 4 includes first and second side arms 40a, 40b that are placed on top edges of the sides of the holster, 20a, 20b, respectively. As such, the filter basket assembly 2 rests on top edges of the sides of the holster, 20a, 20b, via the first and second side arms 40a, 40b, respectively. In FIG. 7, the first and second side arms 40a, 40b include overflow channels 40c, 40d, respectively, through which water may flow under overflow conditions (illustrated by solid arrows), for example, when the filter media (not shown) within the filter element (not shown) or filter cartridge 4b becomes clogged with debris and no longer permits sufficient water-flow therethrough, i.e., no longer permits water-flow from the inner plenum 4g, through the cartridge, element, and media to the outer plenum 4h and back into the aquarium tank via the spout 4c.

Figure 8:
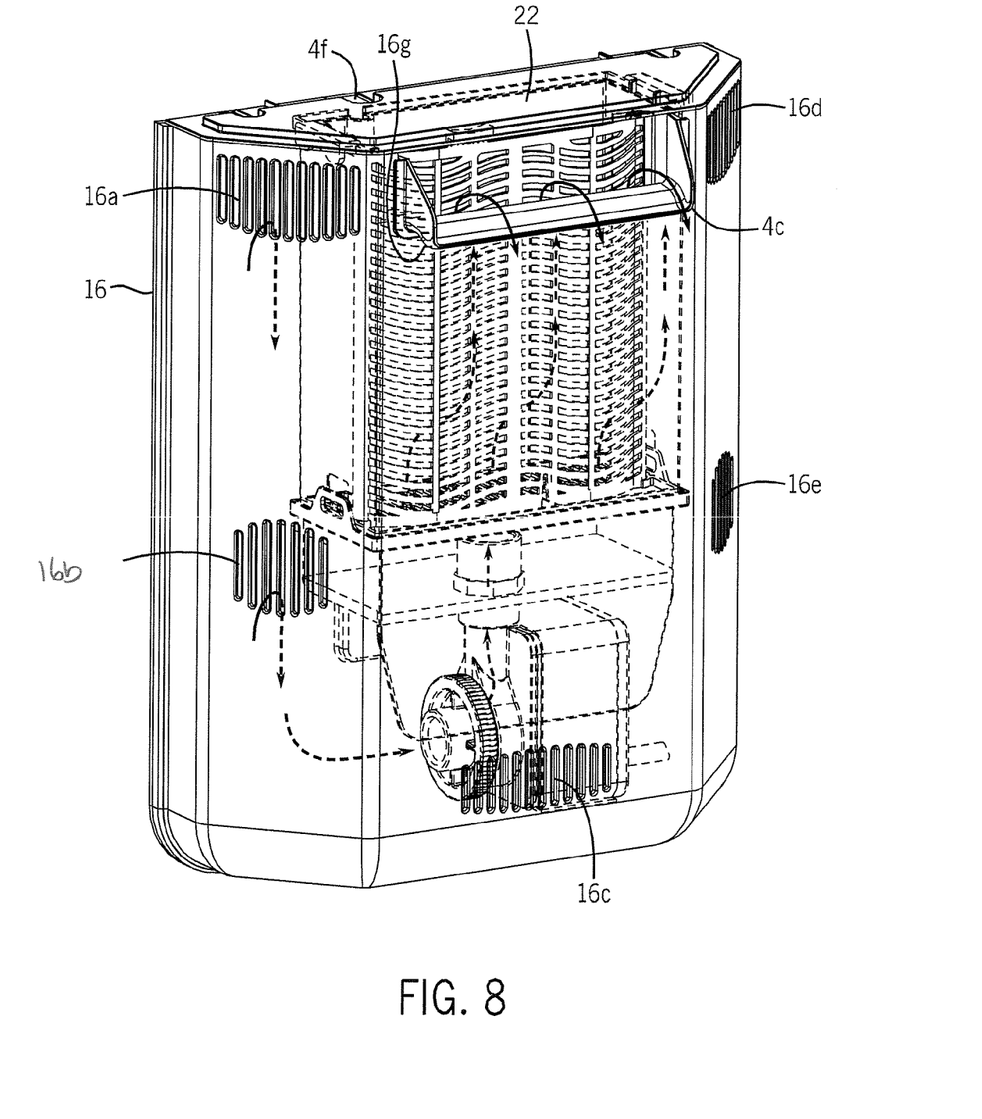
FIG. 8 provides a front perspective view of one embodiment of a filter assembly as contemplated herein.

FIG. 8 provides a front perspective view of one embodiment of a filter assembly 30 as contemplated herein. In FIG. 12, the filter assembly 30 includes a housing 16 that houses the filter basket assembly 2 within a holster 20. The housing 16, includes one or more inlet grates 16a, 16b, 16c, 16d, and 16e, through which water of the aquarium tank may enter or exit the housing 16. For example, water may enter the housing 16 via the inlet grates 16a, 16b, 16c, 16d, and 16e, flow into the filter basket assembly 2, and return back into the aquarium tank as indicated by dashed arrows. The spout 4c may rest on a lip 16g of the housing. An optional lid 22 is shown.

Figure 9:
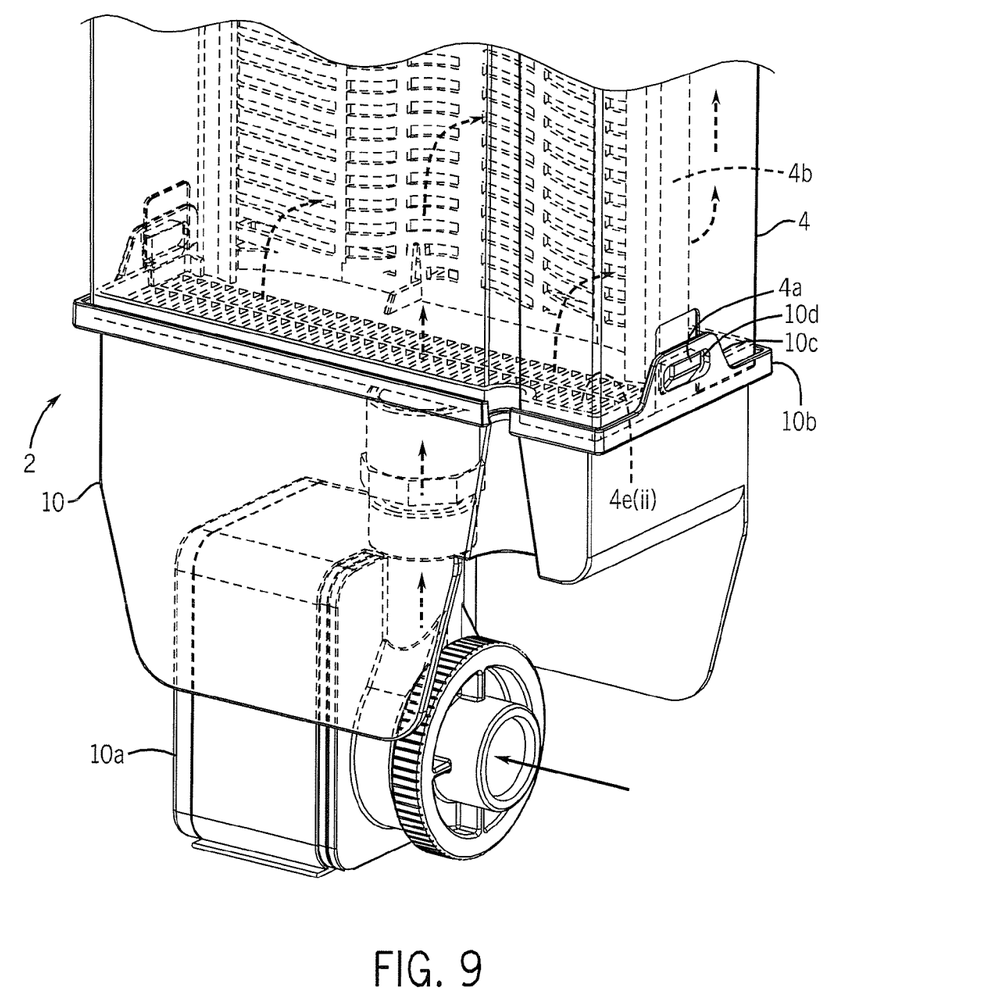
FIG. 9 provides an enlarged back perspective view of one embodiment of an upstream pump basket of a filter assembly as contemplated herein.

FIG. 9 provides an enlarged back perspective view of one embodiment of an upstream pump basket of a filter assembly as contemplated herein. In FIG. 9, the filter pump 10a is horizontally oriented and connected to the filter pump basket 10. As indicated by the dashed arrows, water-flows horizontally into the pump and is redirected vertically upwards through the filter basket assembly 2.

Figure 10:
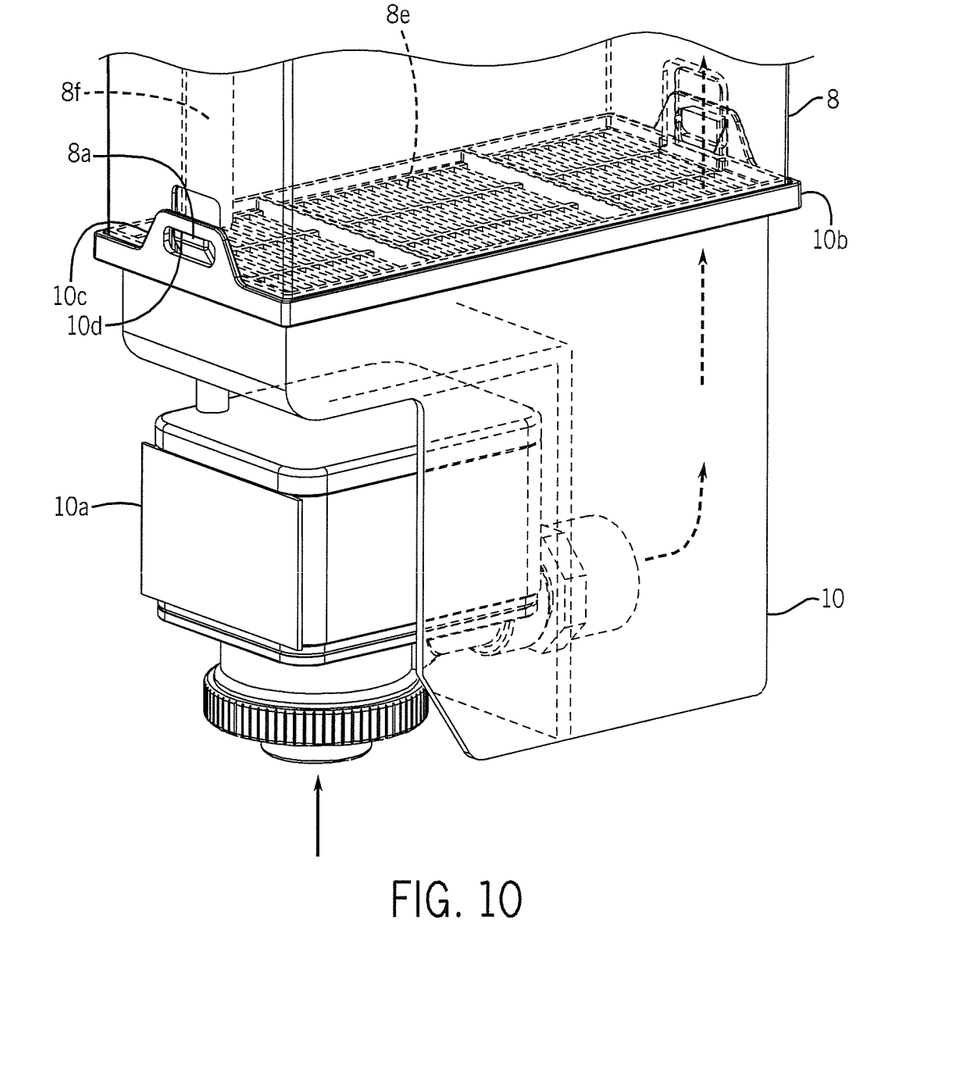
FIG. 10 provides an enlarged back perspective view of another embodiment of an upstream pump basket of an assembly as contemplated herein.

FIG. 10 provides an enlarged back perspective view of another embodiment of a pump basket of an assembly as contemplated herein. In FIG. 10, the filter pump 10a is vertically oriented and connected to the filter pump basket 10. As indicated by the dashed arrows, water-flows vertically upwards into the filter pump basket 10, is redirected first horizontally, and then redirected vertically upwards through the filter basket assembly 2.

In some embodiments of the filter assemblies disclosed herein, the assemblies may or may not be permanently bonded to the inside wall of an aquarium, such that the main housing of the filter is fixed to the aquarium wall but the filter basket assembly containing the filter media and filter pump are easily removable. In further embodiments of the disclosed filter assemblies, the plurality of filter baskets includes a downstream filter cartridge basket having a dual purpose, for example, serving as a housing for the filter cartridge and providing an outlet spout for water to return to the aquarium tank.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

The invention claimed is:

1. A filter assembly for an interior of an aquarium tank, the assembly comprising a plurality of filter baskets, the plurality of filter baskets comprising:
   (a) at least a downstream filter cartridge basket comprising a filter cartridge containing filter media and at least a partially grated floor, and
   (b) an upstream filter pump basket and a filter pump connected directly thereto;
   wherein the plurality of baskets are connected at one or more sealed junctures; and water is pumped into the downstream filter pump basket upwards through the grated floor of the downstream filter basket, through the filter cartridge and filter media, and out of the downstream filter cartridge basket;
   wherein the filter cartridge divides the downstream filter cartridge basket laterally to provide an inner plenum and an outer plenum; and
   wherein the at least partially grated floor is provided at the inner plenum and the downstream filter cartridge basket further comprises a solid floor provided at the outer plenum.

2. The filter assembly of claim 1, further comprising:
   (c) at least one intermediary filter basket between the downstream filter cartridge basket and the upstream filter pump basket and comprising at least a partially grated floor;
   wherein the intermediary filter basket is connected at a sealed juncture to the downstream filter cartridge basket and the intermediary filter basket is connected at a sealed juncture to the upstream filter pump basket;
   wherein water is pumped into the intermediary filter pump basket upwards through the grated floor of the intermediary filter basket, through the grated floor of the downstream filter basket, through the filter cartridge, and out of the downstream filter cartridge basket.

3. The filter assembly of claim 2, comprising at least two intermediary filter baskets.

4. The filter assembly of claim 1, wherein the downstream filter cartridge basket is connected directly at a sealed juncture to the upstream filter pump basket.

5. The filter assembly of claim 1, wherein the downstream filter cartridge basket further comprises a spout directing water back into the aquarium tank.

6. The filter assembly of claim 1, wherein the at least one sealed juncture is provided by a friction fit between a top perimeter of one filter basket and a bottom perimeter of an adjacent downstream filter basket.

7. The filter assembly of claim 6, wherein the friction fit comprises an interlocking ridge and groove mechanism.

8. The filter assembly of claim 1, wherein the plurality of baskets wherein adjacent baskets are connected by one or more slot and latch mechanisms.

9. The filter assembly of claim 1, wherein the assembly comprises a horizontally oriented filter pump connected to the upstream filter pump basket.

10. The filter assembly of claim 1, wherein the assembly comprises a vertically oriented filter pump connected to the upstream filter pump basket.

11. The filter assembly of claim 1, wherein the assembly comprises a vertical filler pump inside the filter pump basket.

12. The filter assembly of claim 1, wherein the filter media is supported in a filter element, the filter element having a plurality of water-flow openings therethrough.

13. The filter assembly of claim 1, further comprising a housing that contains the filter basket assembly.

14. A filter assembly for an interior of an aquarium tank, the assembly comprising a plurality of filter baskets, the plurality of filter baskets comprising:
   (a) at least a downstream filter cartridge basket comprising a filter cartridge containing filter media and at least a partially grated floor; and
   (b) an upstream filter pump basket and a filter pump connected directly thereto;
   wherein the plurality of baskets are connected at one or more sealed junctures; and water is pumped into the downstream filter pump basket upwards through the grated floor of the downstream filter basket, through the filter cartridge and filter media, and out of the downstream filter cartridge basket;
   wherein the filter cartridge divides the downstream filter cartridge basket laterally to provide an inner plenum and an outer plenum;
   wherein the at least partially grated floor is provided at the inner plenum and the downstream filter cartridge basket further comprises a solid floor provided at the outer plenum; and
   wherein the downstream filter cartridge basket further comprises channels permitting flow that bypasses the filter media.

15. The filter assembly of claim 14, further comprising:
   (c) at least one intermediary filter basket between the downstream filter cartridge basket and the upstream filter pump basket and comprising at least a partially grated floor;
   wherein the intermediary filter basket is connected at a sealed juncture to the downstream filter cartridge basket and the intermediary filter basket is connected at a sealed juncture to the upstream filter pump basket;
   wherein water is pumped into the intermediary filter pump basket upwards through the grated floor of the intermediary filter basket, through the grated floor of the downstream filter basket, through the filter cartridge, and out of the downstream filter cartridge basket.

16. The filter assembly of claim 14, comprising at least two intermediary filter baskets.

17. The filter assembly of claim 14, wherein the downstream filter cartridge basket is connected directly at a sealed juncture to the upstream filter pump basket.

* * * * *

UNITED STATES PATENT AND TRADEMARK OFFICE
CERTIFICATE OF CORRECTION

PATENT NO. : 8,679,330 B2
APPLICATION NO. : 12/971807
DATED : March 25, 2014
INVENTOR(S) : Brad L. Mihlbauer It is certified that error appears in the above-identified patent and that said Letters Patent is hereby corrected as shown below:

In the Claims

Please amend
Col. 6, Claim 1, lines 28-48,
1. A filter assembly for an interior of an aquarium tank, the assembly comprising a plurality of filter baskets, the plurality of filter baskets comprising:
    (a) at least a downstream filter cartridge basket comprising a filter cartridge containing filter media and at least a partially grated floor; and
    (b) an upstream filter pump basket and a filter pump connected directly thereto;
    wherein the plurality of baskets are connected at one or more sealed junctures; and water is pumped into the downstream filter ~~pump~~ <u>cartridge</u> basket upwards through the grated floor of the downstream filter <u>cartridge</u> basket, through the filter cartridge and filter media, and out of the downstream filter cartridge basket;
    wherein the filter cartridge divides the downstream filter cartridge basket laterally to provide an inner plenum and an outer plenum; and
    wherein the at least partially grated floor is provided at the inner plenum and the downstream filter cartridge basket further comprises a solid floor provided at the outer plenum.

Col. 7-8, Claim 14, lines 26-14,
14. A filter assembly for an interior of an aquarium tank, the assembly comprising a plurality of filter baskets, the plurality of filter baskets comprising:
    (a) at least a downstream filter cartridge basket comprising a filter cartridge containing filter media and at least a partially grated floor; and
    (b) an upstream filter pump basket and a filter pump connected directly thereto;
    wherein the plurality of baskets are connected at one or more sealed junctures; and water is pumped into the downstream filter ~~pump~~ <u>cartridge</u> basket upwards through the grated floor of the downstream filter <u>cartridge</u> basket, through the filter cartridge and filter media, and out of the downstream filter cartridge basket:

Signed and Sealed this
Eighth Day of July, 2014

Michelle K. Lee
*Deputy Director of the United States Patent and Trademark Office* wherein the filter cartridge divides the downstream filter cartridge basket laterally to provide an inner plenum and an outer plenum;

wherein the at least partially grated floor is provided at the inner plenum and the downstream filter cartridge basket further comprises a solid floor provided at the outer plenum; and wherein the downstream filter cartridge basket further comprises channels permitting flow that bypasses the filter media.